(12) United States Patent
O'Flynn et al.

(10) Patent No.: US 11,861,666 B2
(45) Date of Patent: Jan. 2, 2024

(54) STOCHASTIC APPARATUS AND METHOD FOR ESTIMATING CREDIT CARD TYPE WHEN PREDICTING INTERCHANGE CODE TO PROCESS CREDIT CARD TRANSACTIONS

(71) Applicant: Toast, Inc., Boston, MA (US)

(72) Inventors: Pearse J. O'Flynn, Bantry (IE); Hardeep K. Gill, Boston, MA (US); Alan Z. Zhao, Cambridge, MA (US)

(73) Assignee: Toast, Inc., Boston, MA (US)

( * ) Notice: Subject to any disclaimer, the term of this patent is extended or adjusted under 35 U.S.C. 154(b) by 0 days.

(21) Appl. No.: 17/218,958

(22) Filed: Mar. 31, 2021

(65) Prior Publication Data

US 2022/0318862 A1 Oct. 6, 2022

(51) Int. Cl.
| | |
|---|---|
| *G06Q 40/00* | (2023.01) |
| *G06Q 20/34* | (2012.01) |
| *G06Q 30/0283* | (2023.01) |
| *G06N 20/20* | (2019.01) |
| *G06Q 40/12* | (2023.01) |
| *G06Q 40/03* | (2023.01) |

(52) U.S. Cl.
CPC ......... *G06Q 30/0283* (2013.01); *G06N 20/20* (2019.01); *G06Q 20/34* (2013.01); *G06Q 40/03* (2023.01); *G06Q 40/12* (2013.12)

(58) Field of Classification Search
CPC .. G06Q 30/0283; G06Q 20/34; G06Q 40/025; G06Q 40/12; G06N 20/20
See application file for complete search history.

(56) References Cited

U.S. PATENT DOCUMENTS

| | | | |
|---|---|---|---|
| 7,433,845 B1 | 10/2008 | Flitcroft et al. | |
| 7,882,026 B1 | 2/2011 | Zettner | |
| 8,706,554 B1 | 4/2014 | Whitler | |
| 9,576,282 B2 | 2/2017 | Murphy et al. | |
| 9,691,060 B2 | 6/2017 | Murphy et al. | |
| 10,387,850 B1 | 8/2019 | Srinivasan | |
| 10,402,807 B1 * | 9/2019 | Lyer ........................ | G06N 5/04 |
| 10,467,612 B2 | 11/2019 | Murphy et al. | |

(Continued)

*Primary Examiner* — Peter Ludwig
*Assistant Examiner* — Reva R Moore
(74) *Attorney, Agent, or Firm* — Richard K. Huffman; Huffman Patent Group, LLC

(57) ABSTRACT

A computer-implemented method for predicting interchange charges includes: retrieving a historical transactions set, where each completed transaction in the set includes transaction features, a bank identification number (BIN), and a corresponding true interchange code; transforming all BINs in the set into a corresponding plurality of BIN features that comprise probabilities; creating a first training set including all transaction features, all pluralities of BIN features, and all true interchange codes associated with the historical transactions set; training a random forest model using the first training set and generating a second training set including rounded BIN features, rounded transaction features, discrete ones of the transaction features, and the true interchange codes; training the random forest model using the second training set to generate a trained random forest model for prediction of the interchange codes; and executing the trained random forest model for new transactions to generate corresponding predicted interchange codes.

20 Claims, 5 Drawing Sheets

PAYMENT FACILITATION SERVER WITH INTERCHANGE CODE PREDICTION

(56) References Cited

U.S. PATENT DOCUMENTS

| | | | |
|---|---|---|---|
| 10,540,643 B2 | 1/2020 | Subramanian et al. | |
| 10,915,900 B1 | 2/2021 | Higgins et al. | |
| 11,321,709 B1 | 5/2022 | Kolchin | |
| 2012/0078790 A1 | 3/2012 | Ornce et al. | |
| 2012/0158566 A1 | 6/2012 | Fok et al. | |
| 2013/0054465 A1 | 2/2013 | Sakata et al. | |
| 2013/0268431 A1 | 10/2013 | Mohsenzadeh | |
| 2014/0039999 A1 | 2/2014 | Levene et al. | |
| 2014/0101037 A1 | 4/2014 | Ornce et al. | |
| 2014/0180974 A1 | 6/2014 | Kennel et al. | |
| 2014/0279524 A1 | 9/2014 | Slusser et al. | |
| 2015/0242846 A1 | 8/2015 | Gerard et al. | |
| 2017/0293913 A1* | 10/2017 | Gulak | G06Q 20/3829 |
| 2019/0005484 A1 | 1/2019 | Mohsenzadeh | |
| 2019/0073647 A1 | 3/2019 | Zoldi et al. | |
| 2019/0259041 A1* | 8/2019 | Jackson | G06F 16/288 |
| 2019/0392441 A1 | 12/2019 | Lee et al. | |
| 2020/0118139 A1 | 4/2020 | Kalvit et al. | |
| 2020/0134609 A1 | 4/2020 | Leavitt et al. | |
| 2020/0134627 A1 | 4/2020 | Hamooni et al. | |
| 2020/0184448 A1 | 6/2020 | Jain | |
| 2021/0217014 A1 | 7/2021 | Shetty et al. | |
| 2021/0241256 A1 | 8/2021 | Caldwell | |
| 2022/0101310 A1 | 3/2022 | Kumar et al. | |
| 2022/0164699 A1 | 5/2022 | Neupane et al. | |

* cited by examiner

*PRESENT DAY CREDIT CARD TRANSACTION PROCESSING*

STOCHASTIC APPARATUS AND METHOD FOR ESTIMATING CREDIT CARD TYPE WHEN PREDICTING INTERCHANGE CODE TO PROCESS CREDIT CARD TRANSACTIONS

CROSS-REFERENCE TO RELATED APPLICATIONS

This application is related to the following co-pending U.S. patent applications, each of which has a common assignee and common inventors, the entireties of which are herein incorporated by reference.

| SERIAL NUMBER | FILING DATE | TITLE |
| --- | --- | --- |
| (TST.0177) | — | INTERCHANGE CODE PREDICTION SYSTEM FOR PROCESSING CREDIT CARD TRANSACTIONS |
| (TST.0178) | — | OPTIMIZED INTERCHANGE CODE PREDICTION SYSTEM FOR PROCESSING CREDIT CARD TRANSACTIONS |
| (TST.0180) | — | LOW LATENCY BANK CARD TYPE PREDICTION SYSTEM FOR ESTIMATION OF INTERCHANGE CODES DURING TRANSACTION PROCESSING |
| (TST.0181) | — | SYSTEM FOR DYNAMIC PREDICTION OF INTERCHANGE RATES FOR CREDIT CARD TRANSACTION PROCESSING |

BACKGROUND OF THE INVENTION

Field of the Invention

This invention relates in general to the credit card transaction processing, and more particularly to apparatus and methods for dynamic prediction of interchange codes while processing transactions.

Description of the Related Art

People all over the world use credit cards for payment of goods and services as opposed to using cash. Carrying a credit card is safer than carrying cash and credit cards are easier to use because merchants are not required to make change or take the risk of accepting checks. Because of this, a number of developments in the industry have been fielded that allow even small business owners and owners of mobile and popup businesses to accept payment via using mini card readers that are plugged into their smartphones. By subscribing to a credit card processing service, merchants are provided with the equipment (including application programs) require to accept credit cards as payment instruments and to transmit transactions in real time to the credit card processing service, which charges the merchant for processing the transactions according to a contract that generally specifies charges for a percentage of the transactions (e.g., 2.5% of transaction total amount) along with a per-transaction fee (e.g., $0.10 per transaction). The processing service on a daily basis will transfer an amount totaling all of submitted merchant transactions to the merchant's bank account and will invoice the merchant monthly to recover the processing charges. Or, the processing service may take the processing charges out of the total amount of the merchant transactions and transfer total transactions amount minus a total processing charges amount to the merchant's bank account.

The above system works for many small business owners, mainly because it is easy to understand and takes little to no effort to manage. But such a scheme for pricing processing of credit card transactions may not be in the best financial interests of the merchant or of the payment processing service because the processing charges are mere estimates of the complex charges that are assessed by card networks, issuing banks, and acquiring banks. Accordingly, for more sophisticated merchants, payment processors offer payment processing services that take into account the unique and complicated charges incurred on a per-transaction basis and pass those charges on to the merchant along with a markup margin. But such processing charges are generally known only after the fact and are provided by the payment processing services to the merchants at the end of the month in the form of a bill for those charges, which often represents a substantial amount of revenue.

This application considers a particular processing charge assessed by issuing banks on a per-transaction basis, namely interchange fees. These fees are diverse and complex and per-transaction fees are determined as a function of numerous factors including card network use (e.g., Visa, MasterCard, etc.), how the card is presented (e.g., in person, online, etc.), what kind of merchant (e.g., retail store, restaurant, bar, etc.) is accepting the card, what kind of card is used (e.g., debit, credit, rewards, etc.), and when a card was used to authorize a transaction relative to when the merchant submitted the transaction for processing. Because interchange fees cannot be known until after transactions are processed and the fees are detailed by the issuing banks, processing services generally process the full amount of transactions daily for merchants and issue bills for interchange fees (and other processing fees) at the end of the month which, as is allude to above, is very undesirable from a merchant perspective.

Therefore, what is needed is a system for processing credit card transactions that allows for accurate prediction and assessment of interchange fees when the transactions are processed.

What is also needed is an apparatus and method for prediction of interchange fees in real time that are more accurate than that which has heretofore been provided.

What is further needed is an apparatus and method for assessing predicted interchange fees in a transaction processing system that does not add latency due to predicting interchange fees for the transaction.

SUMMARY OF THE INVENTION

The present invention, among other applications, is directed to solving the above-noted problems and addresses other problems, disadvantages, and limitations of the prior art by providing apparatus and methods for predicting interchange charges for corresponding transactions when those transactions are submitted for processing in a manner that is timelier and more accurate than has heretofore been provided.

In one embodiment, a computer-implemented method for predicting interchange codes corresponding to credit card transactions is provided, the method including: retrieving a historical completed transactions set from a database that corresponds to a plurality of merchants, where each completed transaction in the set includes transaction features, a bank identification number (BIN), and a corresponding true interchange code; transforming all BINs in the set into a corresponding plurality of BIN features that include probabilities of a given BIN falling into each of the corresponding plurality of BIN features, where each of the probabilities are determined by analyzing the historical completed transactions set; creating a first training set including all transaction features, all pluralities of BIN features, and all true interchange codes associated with the historical completed transactions set; training a random forest model using the first training set, where the training includes rounding of all BIN features and non-discrete ones of the transaction features, and generating a second training set including rounded BIN features, rounded transaction features, discrete ones of the transaction features, and the true interchange codes; training the random forest model using the second training set to generate a trained random forest model for prediction of the interchange codes; and executing the trained random forest model for new transactions to generate corresponding predicted interchange codes.

One aspect of the present invention envisages a computer-readable storage medium storing instructions that, when executed by a computer, cause the computer to perform a method for using a computer system to predict interchange codes corresponding to credit card transactions, the method including: retrieving a historical completed transactions set from a database that corresponds to a plurality of merchants, where each completed transaction in the set includes transaction features, a bank identification number (BIN), and a corresponding true interchange code; transforming all BINs in the set into a corresponding plurality of BIN features that include probabilities of a given BIN falling into each of the corresponding plurality of BIN features, where each of the probabilities are determined by analyzing the historical completed transactions set; creating a first training set including all transaction features, all pluralities of BIN features, and all true interchange codes associated with the historical completed transactions set; training a random forest model using the first training set, where the training includes rounding of all BIN features and non-discrete ones of the transaction features, and generating a second training set including rounded BIN features, rounded transaction features, discrete ones of the transaction features, and the true interchange codes; training the random forest model using the second training set to generate a trained random forest model for prediction of the interchange codes; and executing the trained random forest model for new transactions to generate corresponding predicted interchange codes.

Another aspect of the present invention contemplates a computer program product for predicting interchange codes corresponding to credit card transactions, the computer program product including: a computer readable non-transitory medium having computer readable program code stored thereon, the computer readable program code including: program instructions to retrieve a historical completed transactions set from a database that corresponds to a plurality of merchants, where each completed transaction in the set includes transaction features, a bank identification number (BIN), and a corresponding true interchange code; program instructions to transform all BINs in the set into a corresponding plurality of BIN features that include probabilities of a given BIN falling into each of the corresponding plurality of BIN features, where each of the probabilities are determined by analyzing the historical completed transactions set; program instructions to create a first training set including all transaction features, all pluralities of BIN features, and all true interchange codes associated with the historical completed transactions set; program instructions to train a random forest model using the first training set, where the training includes rounding of all BIN features and non-discrete ones of the transaction features, and generating a second training set including rounded BIN features, rounded transaction features, discrete ones of the transaction features, and the true interchange codes; program instructions to train the random forest model using the second training set to generate a trained random forest model for prediction of the interchange codes; and program instructions to execute the trained random forest model for new transactions to generate corresponding predicted interchange codes.

BRIEF DESCRIPTION OF THE DRAWINGS

These and other objects, features, and advantages of the present invention will become better understood with regard to the following description, and accompanying drawings where.

DETAILED DESCRIPTION

Figure 1:
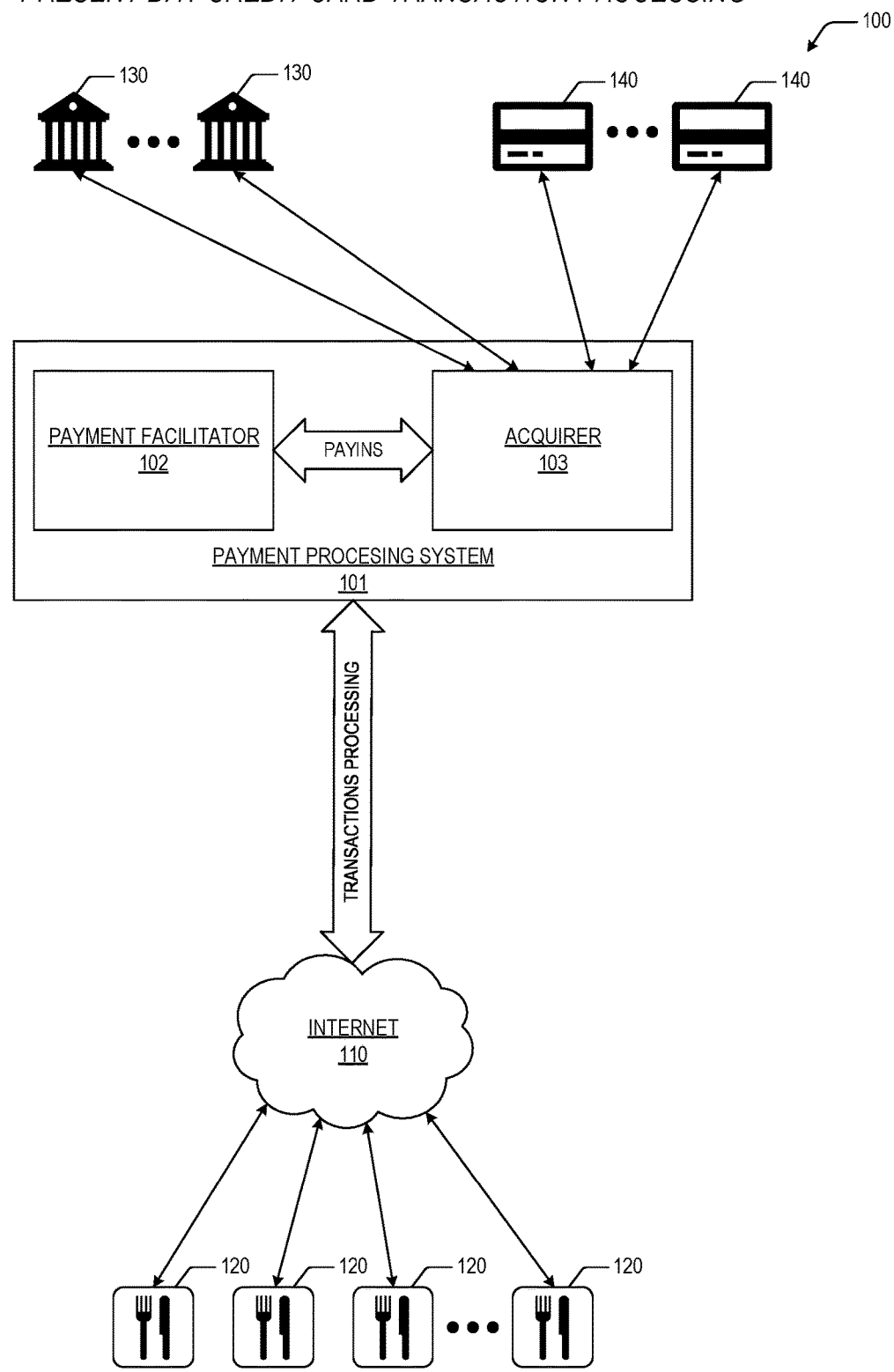
FIG. 1 is a block diagram illustrating a present day technique for processing credit card transactions for merchants.

Exemplary and illustrative embodiments of the invention are described below. It should be understood at the outset that although exemplary embodiments are illustrated in the figures and described below, the principles of the present disclosure may be implemented using any number of techniques, whether currently known or not. In the interest of clarity, not all features of an actual implementation are described in this specification, for those skilled in the art will appreciate that in the development of any such actual embodiment, numerous implementation specific decisions are made to achieve specific goals, such as compliance with system-related and business-related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. Unless otherwise specifically noted, articles depicted in the drawings are not necessarily drawn to scale.

The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase. As used in this disclosure, "each" refers to each member of a set, each member of a subset, each member of a group, each member of a portion, each member of a part, etc.

Applicants note that unless the words "means for" or "step for" are explicitly used in a particular claim, it is not intended that any of the appended claims or claim elements are recited in such a manner as to invoke 35 U.S.C. § 112(f).

Definitions

Integrated Circuit (IC): A set of electronic circuits fabricated on a small piece of semiconductor material, typically silicon. An IC is also referred to as a chip, a microchip, or a die.

Central Processing Unit (CPU): The electronic circuits (i.e., "hardware") that execute the instructions of a computer program (also known as a "computer application," "application," "application program," "app," "computer program," or "program") by performing operations on data, where the operations may include arithmetic operations, logical operations, or input/output operations. A CPU may also be referred to as a "processor."

Module: As used herein, the term "module" may refer to, be part of, or include an application specific integrated circuit (ASIC), an electronic circuit, a processor (shared, dedicated, or group) and/or memory (shared, dedicated, or group) that execute one or more computer programs, a combinational logic circuit, and/or other suitable components that provide the described functionality.

Microprocessor: An electronic device that functions as a CPU on a single integrated circuit. A microprocessor receives digital data as input, processes the data according to instructions fetched from a memory (either on-die or off-die), and generates results of operations prescribed by the instructions as output. A general-purpose microprocessor may be employed in a desktop, mobile, or tablet computer, and is employed for uses such as computation, text editing, multimedia display, and Internet browsing. A microprocessor may also be disposed in an embedded system to control a wide variety of devices including appliances, mobile telephones, smart phones, and industrial control devices.

Multi-Core Processor: Also known as a multi-core microprocessor, a multi-core processor is a microprocessor having multiple CPUs ("cores") fabricated on a single integrated circuit.

Instruction Set Architecture (ISA) or Instruction Set: A part of a computer architecture related to programming that includes data types, instructions, registers, addressing modes, memory architecture, interrupt and exception handling, and input/output. An ISA includes a specification of the set of opcodes (i.e., machine language instructions), and the native commands implemented by a particular CPU.

x86-Compatible Microprocessor: A microprocessor capable of executing computer applications that are programmed according to the x86 ISA.

Microcode: A term employed to refer to a plurality of micro instructions. A micro instruction (also referred to as a "native instruction") is an instruction at the level that a microprocessor sub-unit executes. Exemplary sub-units include integer units, floating point units, MMX units, and load/store units. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a sub-unit or sub-units within the CISC microprocessor.

Internet: The Internet is a global wide area network connecting computers throughout the world via a plurality of high-bandwidth data links which are collectively known as the Internet backbone. The Internet backbone may be coupled to Internet hubs that route data to other locations, such as web servers and Internet Service Providers (ISPs). The ISPs route data between individual computers and the Internet and may employ a variety of links to couple to the individual computers including, but not limited to, cable, DSL, fiber, and Wi-Fi to enable the individual computers to transmit and receive data over in the form of email, web page services, social media, etc. The Internet may also be referred to as the world-wide web or merely the web.

In view of the above background discussion on credit card transaction processing and associated techniques employed within present-day transaction processing systems, a discussion of these associated techniques, along with their disadvantages and limitations, will be presented with reference to FIG. 1. Following this, a discussion of the present invention will be presented with reference to FIGS. 2-5. The present invention overcomes these disadvantages and limitations by providing a system and method for processing credit card transactions where interchange rates are predicted at a transaction level and in a manner that is timelier than that which has heretofore been provided.

Turning to FIG. 1, a block diagram 100 is presented illustrating a present day technique for processing credit card transactions on behalf of merchants. The diagram 100 shows a payment processing system 101, that is coupled via the internet cloud 110 to a plurality of merchants 120. The payment processing system 101 is also coupled to a plurality of issuing banks ("issuers") 130 and to a plurality of credit card networks 140. In the embodiment shown in the diagram 100, the payment processing system 101 preferably includes an acquirer ("acquiring bank" or "payment processor") 103 that receives payment instructions from and transmits responses to a payment facilitator 102, where those payment instructions and responses are transmitted and received by the payment facilitator 102 via conventional communications channels, preferably messages transmitted and received via secure connections over the internet. The payment facilitator 102 is tightly coupled to the acquirer 103, to the extent that processing of credit card transactions on behalf of the merchants 120 is perceived by the merchants 120 as being performed exclusively by the payment facilitator 102. The merchants 120 may subscribe to credit card transaction processing services along with other services provided by the payment facilitator 102, and may utilize the payment facilitator 102 to authorize credit card transactions for their guests, to capture those credit card transactions, and to complete those transactions by transferring corresponding amounts—generally daily—to their corresponding bank accounts.

Accordingly, the payment facilitator 102 may ask the acquirer 103 to query the issuing banks 130 to authorize charges captured by the merchants 120 and may provide instructions for processing credit card transactions and for transferal of corresponding amounts of money to the merchants' bank accounts. The acquirer 103 may subsequently communicate with the issuers 130 (according to type of credit card used) to obtain authorized funds for the credit card transactions and may deposit these authorized funds in the merchants' bank accounts. Likewise, the acquirer 103 may track of all of the per-transaction fees that are charged by the issuers 130 and card networks 140, and may pass these fees (along with a markup margin) on to the payment facilitator 102, generally on a monthly basis. In turn, the payment facilitator 102 may provide statements to the merchants 120, typically monthly, according to terms of each of the merchants' contracts with the payment facilitator 102 to recover these per-transaction fees, the markups added by the acquirer 102, and margins for the payment facilitator 102, and the merchants 120 are expected to make timely payments for their respective amounts due. Because of the complexities and uncertainties associated with charges fees assessed by the issuers 130 and card networks 140, the statements may show a credit, but more often than not, the statements show a balance due.

Depending on the size and complexity of a merchant 120, the merchant's contract with the payment facilitator 102 may include fees for services other than processing of credit card transactions, and additionally may include per-transaction fees for processing each of the credit card transactions. For small merchants 120 that don't process as many transactions as larger merchants 120, credit card processing fees are generally assessed by the payment facilitator 102 in the form of a per-transaction base fee plus a transaction percentage of the charged amount, and the base fee and percentage may differ according to which card is used (e.g., MasterCard, Visa, American Express, etc.) and whether card was presented by the card owner (via contactless payment, swipe, inserted chip, etc.) or entered manually (either online or via merchant terminal). For example, merchants 120 may pay the facilitator 102 a base fee of 10 cents per transaction plus 2.5 percent of the transaction total for cards presented by in person and a base fee of 15 cents per transaction plus 3.5 percent of the total for manually ("digitally") entered cards. Most small businesses adhere to this "fixed fee" model for transaction processing because it is simple and does not expose the merchants 120 to the complexity of charges presented by the issuing banks 130, card networks 140, and the payment processor 103. Accordingly, the merchants 120 capture their transactions, generally daily, and send them to the payment facilitator 102. In conjunction with the payment processor 103, the transactions are processed, and the following day the full transaction amount for each of the captured transactions is transferred to the merchants' bank accounts. At the end of the month, the payment facilitator 102 sends statements to the merchants 120 that itemize each of the per-transaction charges along with a total amount due. According to the exemplary per-transaction charges discussed above, a small merchant 120 having credit card charges totally $100,000.00 each month would be presented with a bill of at least $2,500.00, which is a significant percentage of the merchant's revenue. These monthly charges may not be optimum, but they are easy to comprehend and are viewed by small merchants 120 as merely one of the costs of accepting credit cards.

Larger, more sophisticated merchants 120 may opt to contract with the payment facilitator 102 under terms that expose more of the complexities of fees assessed by the issuers 130, the card networks 140, the payment processor 103, and the payment facilitator 102. In practice, as one skilled in the art will appreciate, the margins added by the payment processor 103 and payment facilitator 102 are generally fixed for a period of time (by contract), and the fees added by the card networks 140 are known well enough to be deemed accurate. However, the per-transaction fees (i.e., "interchange fees") assessed by the issuing banks 130 are diverse and complex, and are at least a function of card type (e.g., debit, credit, pre-paid debit, regulated debit, rewards level, etc.), card use (e.g., physically present or digitally entered), type of business (i.e., merchant category code), and timeliness of submitting captured transactions to the payment facilitator 102 for processing. For instance, the interchange fee associated with a Visa Debit Business Regulated card, physically presented for payment at a restaurant, and transmitted to the facilitator 102 for processing on the same day may incur an interchange fee that is just a small fraction of the interchange fee that may be assessed for a charge for the same amount, but where the card is a Visa Credit Rewards Traditional (a high rewards level card) that is digitally entered for payment at a bar, and that is transmitted to the facilitator 102 for processing three days after the charge was made. At present, there are over 2,000 different types of interchange fees ("interchange codes"). It is not within the scope of the present invention to provide an in-depth tutorial of all of the interchange codes, but to teach aspects of the present invention that acknowledge the complex nature of interchange code assignments, for these assignments rely upon rules that are unique to the issuers 230 and thereby cannot be had by deterministic methods.

Consequently, merchants 120 that opt to contract under the terms discussed above—interchange plus terms versus fixed fees terms—may reap the benefits of lower per-transaction fees overall, but like fixed fees terms, the merchants 120 have no accurate insight into these fees until they receive a statement from the facilitator 102 at the end of the month. Like fixed fees pricing (where the facilitator 102 charges a per-transaction fee plus a percentage of the total), under interchange plus pricing (where the facilitator charges to cover network fees and interchange fees along with a margin), transaction amounts in full are transferred to merchant bank accounts the next day and the merchants 120 only gain insight into the interchange charges at month's end when statements are received from the payment facilitator 102.

To recap, fixed pricing models provided by the payment facilitator 102 to the merchants ("subscribers") 120 include a per-transaction fee plus a percentage (i.e., fixed fee model), where the total transaction amount is transferred to the merchants' banks following completion and statements at the end of the month detail the fees for each of the transactions. Interchange plus pricing models provided by the payment facilitator 102 to the merchants 120 comprise the actual interchange fees charged by the issuing banks plus fees to cover network charges, payment processor charges, and margin for the payment facilitator 102. In either case, accurate insight into the actual per-transaction charges is only gained at the end of the month. This applies to both merchants 120 and the facilitator 102, for neither entity can estimate, except at a coarse level, the interchange code that is going to be assessed for a particular transaction at the time the transaction is submitted for processing. Not only are the interchange codes diverse and complex, but they change with the introduction of new card types and differing rewards associated with those card types. These codes are published biannually by various banks and card issuers in the form of so-called interchange qualification matrices, none of which are comprehensive or regulated.

Consequently, whether accepting fixed terms or interchange plus terms, a merchant 120 is somewhat at the mercy of all of upper level agents (i.e., payment facilitator 102, payment processor 103, card networks 140, and issuers 130) for per-transaction assessment of fees, and the merchant only learns at the end of the month what the true costs were for accepting credit cards that month. Merchant issues notwithstanding, the payment facilitator 102 is likewise at risk because the facilitator 102 must maintain sufficient capital to essentially float these highly variable interchange fees on behalf of its subscribers 120, for the payment facilitator 102 will receive a statement from the payment processor 103 at the end of the month as well detailing true per-transaction charges comprising these interchange codes and network charges.

The present inventors have noted that the inability to accurately predict interchange fees on a per-transaction basis is a bottleneck in many verticals with decreasing profit margins, and have also sensed pulls in the art from several directions for more accurate interchange code (IC) predictions. First, as one skilled in the art will appreciate, while merchants 120 overwhelmingly desire access to funds from completed credit card transactions within 24 hours of capture, the merchants 120 also do not want to be surprised at the end of the month by a statement assessing true interchange fees (along with other transaction processing fees) in an amount that is a significant portion of revenue, and would rather pay for these fees on a daily basis to minimize the pain at the end of the month. In addition, payment facilitators 102, especially those with tens of thousands of subscribers 120, are likewise cash flow conscious and prefer minimize cash flow regarding funding of transaction processing fees on a daily basis. As one skilled in the art will concur, payment processors 103, such as WorldPay by FIS, provide daily reports to payment facilitators 102 that detail true interchange codes for all completed transactions, but the complexity of these reports precludes providing similar content statements daily to each of their subscribers 120. No merchant 120 wants to be billed every day for transactions processed for such would be a labor-intensive and accounting nightmare. Rather, merchants 120 merely want the best deal that can be had for processing credit card transactions, which is often interchange plus terms, but they don't want a large bill at month's end for all of the fees incurred. In fact, the present inventors have observed that what is required is a more accurate and timelier technique for predicting fees, particularly interchange codes, on a per-transaction basis, so that the predicted fees can be held back daily from total processed amounts, and so that a reasonable payment is required at month's end to the payment facilitator 102 that reflects accumulated small differences between the predicted per-transaction fees and the true per-transaction fees.

The present invention overcomes the disadvantages and limitations of today's credit card processing techniques by providing apparatus and methods for predicting interchange codes on a per-transaction basis in a system that accurately predicts interchange fees while processing each transaction, and that holds back those fees from merchant bank accounts on a daily basis. The present invention will now be discussed with reference to FIGS. 2-5.

Figure 2:
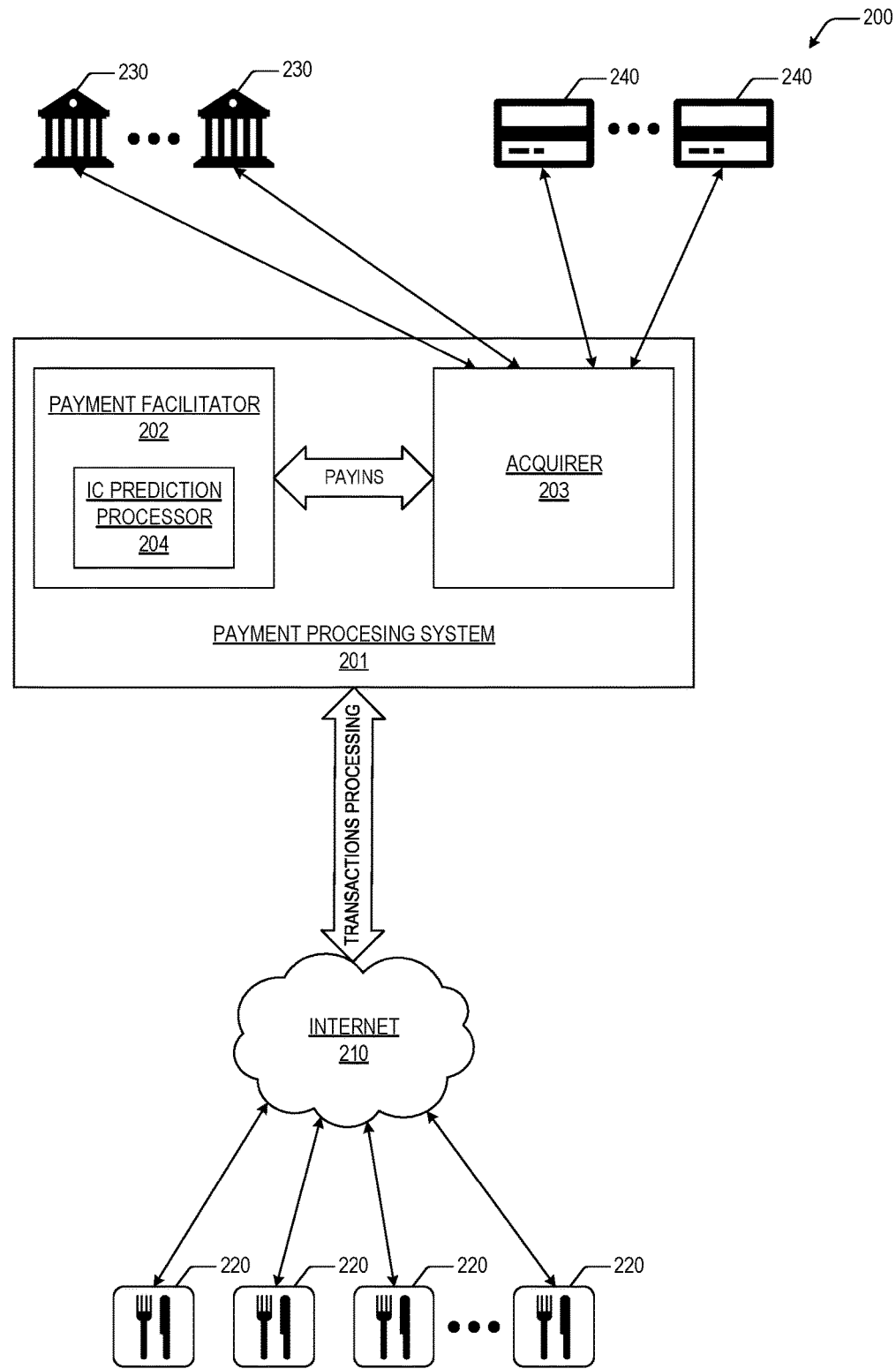
FIG. 2 is a block diagram depicting a transaction-based dynamic interchange code prediction system according to the present invention.

Referring to FIG. 2, a block diagram 200 is presented depicting a transaction-based dynamic interchange code prediction system according to the present invention. Like the diagram 100 of FIG. 1, diagram according to the present invention 200 shows a payment processing system 201, that is coupled via the internet cloud 210 to a plurality of merchants 220. The payment processing system 201 is also coupled to a plurality of issuing banks ("issuers") 230 and to a plurality of credit card networks 240. In the embodiment shown in the diagram 200, the payment processing system 201 preferably includes an acquirer 203 that receives payment instructions from and transmits responses to a payment facilitator 202, where those payment instructions and responses are transmitted and received by the payment facilitator 202 via conventional communications channels, preferably messages transmitted and received via secure connections over the internet. The payment facilitator 202 is tightly coupled to the acquirer 203, to the extent that processing of credit card transactions on behalf of the merchants 220 is perceived by the merchants 220 as being performed exclusively by the payment facilitator 202. The merchants 220 may subscribe to credit card transaction processing services along with other services provided by the payment facilitator 202, and may utilize the payment facilitator 202 to authorize credit card transactions for their guests, to capture those credit card transactions, and to complete those transactions by transferring corresponding amounts—generally daily—to their corresponding bank accounts. In a preferred embodiment, approximately 50,000 merchants 220 subscribe to services provided by the payment facilitator 202, and the payment facilitator processes approximately 50 million credit card transactions per month for all of its subscribers 220.

Accordingly, the payment facilitator 202 may ask the acquirer 203 to query the issuing banks 230 to authorize charges captured by the merchants 220 and may provide instructions for processing credit card transactions and for transferal of corresponding amounts of money to the merchants' bank accounts. The acquirer 203 may subsequently communicate with the issuers 230 (according to type of credit card used) to obtain authorized funds for the credit card transactions and may deposit these authorized funds in the merchants' bank accounts. Likewise, the acquirer 203 may track of all of the per-transaction fees that are charged by the issuers 230 and card networks 240, and may pass these fees (along with a markup margin) on to the payment facilitator 202, generally on a monthly basis. In turn, the payment facilitator 202 may provide statements to the merchants 220, typically monthly, according to terms of each of the merchants' contracts with the payment facilitator 202 to reconcile these per-transaction fees, the markups added by the acquirer 203, and margins for the payment facilitator 202.

Like the payment facilitator 102 of FIG. 1, the payment facilitator 202 according to the present invention may contract with some of the merchants 220 based on a fixed fee per-transaction pricing model, as is discussed above. However, for purposes of clearly teaching aspects of the present invention, attention is directed to those merchants 220 that are contracted with the payment facilitator under an interchange plus pricing model that exposes more of the complexities of fees assessed by the issuers 230, the card networks 240, the payment processor 203, and the payment facilitator 202. As noted above with reference to FIG. 1, the margins added by the payment processor 203 and payment facilitator 202 are generally fixed for a period of time (by contract), and the fees added by the card networks 240 are known well enough to be deemed accurate. But as is also noted above, the interchange fees assessed by the issuing banks 230 are diverse and complex, and are at least a function of card type (e.g., debit, credit, pre-paid debit, regulated debit, rewards level, etc.), card use (e.g., physically present or digitally entered), type of business (i.e., merchant category code), and timeliness of submitting captured transactions to the payment facilitator 202 for processing.

By processing approximately 50 million credit card transactions per month for roughly 50,000 subscribers, the present inventors have observed that there are factors in addition to card type, card use, type of business, and submission timeliness that may be employed to more accurately predict interchanges codes on a per-transaction basis, at the time when the payment facilitator 202 submits captured transactions to the acquirer 203 for payment to the merchants 220. These factors, as will be discussed in more detail below, may be observed by generated predictive models that apply these factors as inputs for each transaction, where the model predicts a probabilistic distribution of possible interchange codes for the transaction, and by comparing predicted interchange fees derived from the distribution and known interchange fees charged for each of the possible interchange codes with actual interchange codes and corresponding fees assessed in transactions stored in a historical subscriber transaction database.

More specifically, the present inventors have performed extensive research of historical subscriber transactions related to interchange codes assigned for those transactions by the issuing banks 230, and have observed that the following factors ("variables") underpin and influence interchange categorization (e.g., the process by which interchange codes is assigned to transactions):

bank identification number (BIN) of the payment instrument used for the transaction (i.e., the first six digits of the credit card number, which is generally associated with a particular rewards category);

type of transaction (i.e., card use—whether the payment instrument was physically presented for the purchase along or digitally entered along with other use factors such as swiped, contactless, chip, etc.);

card network itself, for each card network (i.e., MasterCard, Visa, American Express, Discover, etc.) has its own interchange codes;

total amount of the transaction (e.g., some issuers 230 offer lower interchange rates to small and medium business (SMB) merchants 220 for small transaction amounts);

tip percentage (e.g., for restaurants, there is a minimum tip percentage threshold provided by some issuers 230 that qualifies transactions for a lower interchange rate);

card type (i.e., prepaid debit, debit, credit, etc.);

address verification system (AVS) response (i.e., an additional identification verification security measure employed by the payment facilitator 202 for card not present purchases to determine if a billing address of a card owner matches that provided to the issuing bank 230, a failure of which will result in a downgrade (i.e., a different interchange code having a higher interchange fee));

time in hours between transaction authorization (i.e., when the card/card number is presented for payment) and transaction capture (i.e., submission of the transaction to the payment facilitator 202 for processing), because exceeding a threshold (provided by the issuer 230) in hours will result in a downgrade; and merchant category code (i.e., a designator for type of merchant such as a retail store, restaurant, or bar).

The above factors are known or determined by the payment facilitator at the time a transaction is authorized and captured, where some of the factors (e.g., BIN, authorization time, total amount, tip percentage, etc.) are transmitted by the merchant 220 to the payment facilitator, and other factors (e.g., AVS merchant category code, card type, etc.) are obtained by the payment facilitator from stored subscriber and transaction data or from third party services.

Through their research and analyses, the present inventors have realized that it is disadvantageous to formulate interchange code predication as a regression problem, where a model directly predicts the interchange fee itself for a transaction, but rather should be formulated as a classification problem where a classification model predicts a target interchange category, where the target interchange category then assigns to a specific percent fee and base fee that may be employed to calculate a final interchange fee. A random forest model is preferably employed as the classification model.

Because formulating interchange code predication as a classification problem, as one skilled in the art will appreciate, it is necessary to employ rounding to reduce numerical values using rounding to appropriate values to achieve dimensional reduction of existing categorical features. As will be discussed in more detail below, in addition to performing classification modeling for prediction of interchange codes, the present inventors have noted that rather than executing a model each time a transaction is processed, it is preferable to train an interchange code prediction model, to execute the trained interchange code prediction model for all combinations of the above-noted features (as rounded and categorized to reduce dimensionality without sacrificing accuracy), and to deploy table of interchange code results in the payment processing system 101 that utilizes the above-noted transaction features (as rounded and categorized) to index entries in the table that provide extremely accurate predicted interchange fees for each transaction.

In formulating the classification model, the present inventors have discovered several rules that govern prediction of interchange codes. For example, the classification model has naturally determined a tip ratio of 20% a "tolerance" level that splits two interchange categories, and thus the range of a tip percentage (a real number) may be reduced to two values: less than or equal to 20 percent and greater than 20 percent. Examination of the random forest decision nodes both validated and corrected industry derived cut points in the process of turning this problem into a batch inference one. Other dimensional reductions were driven by business knowledge, and then validated by model performance. For example, the 10 types of card interactions (e.g., swipe, dip, digitally keyed, contactless) were reduced to just two cases:

card present and card not present. Research in generating the prediction model also showed that the 100,000 BINS could be parsed into broader BIN categories, namely regulated debit, debit, rewards, and high rewards without sacrificing accuracy.

These insights and other insights described below have resulted in the present invention shown in the block diagram 200, where the payment facilitator 202 includes an interchange code prediction processor 204 that predicts an interchange code and resulting interchange fee for each transaction transmitted for processing by a merchant 220 at the time the transaction is captured. The interchange code prediction processor 204 further transmits the transaction amount along with a holdback amount to the acquirer 203, preferably along with other transaction amounts and corresponding holdback amounts for the merchant 220 to the acquirer 203 on a daily basis. In turn, the acquirer 203 settles the merchant's transactions within a day by transferring all of the merchant's holdback amounts to the payment facilitator 202 and transferring funds for the difference between total transaction amounts and total holdback amounts to the merchant's bank account. The acquirer 203 may send a daily report to the payment facilitator 202 that indicates the true interchange fees charged for each of the completed transactions, which the payment facilitator 204 may employ for retraining of the interchange code prediction processor 204 and which may be employed for generating monthly statements to the merchant 220 detailing the differences between predicted interchange fees held back by the payment facilitator 202 and the actual interchange fees charged by the issuers 230. This process may be executed for all of the merchants 220 that subscribe to the payment facilitator 202 for processing of transactions. In one embodiment, the payment facilitator 202 may predict interchange fees, holdback fee amounts, and complete transactions for approximately 50,000 subscribers as a rate of 50 million transactions per month.

Advantageously, the transaction-based dynamic interchange code predication system according to the present invention provides for very accurate prediction and holdback of transaction interchange fees at the time of transaction processing, resulting in significant reductions in amounts due from merchants 220 to the payment facilitator 204 at the end of the month when statements are issued. In addition, because a lookup table of interchange fees is employed on a per-transaction basis, as will be discussed in more detail below, the present invention significantly reduces the latency associated with predicting and applying interchange fees for each transaction, thus increasing performance and throughput of the payment facilitator 202.

Figure 3:
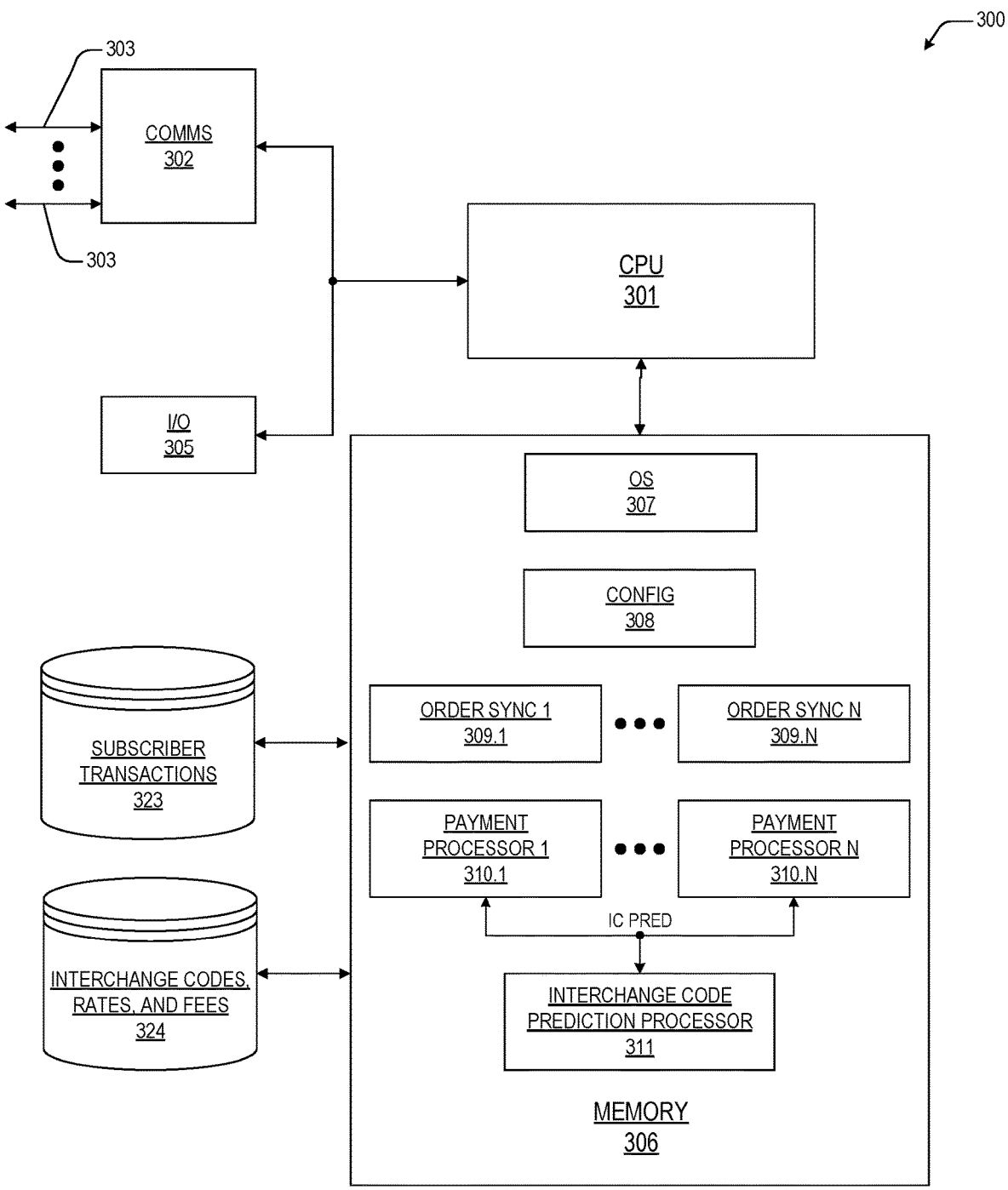
FIG. 3 is a block diagram featuring a payment facilitation server with interchange code prediction according to the present invention, such as may be employed in the system of FIG. 2.

Now referring to FIG. 3, a block diagram is presented featuring a payment facilitation server 300 with interchange code prediction capabilities according to the present invention, such as may be employed in the payment facilitator 202 of FIG. 2. The server 300 may be embodied as a central processing unit (CPU) 301 that is coupled to a memory 306 having both transitory and non-transitory memory components therein. The CPU 301 is also coupled to a communications circuit 302 that couples the server 300 to the internet cloud 210 via one or more wired and/or wireless links 303 that may include, but are not limited to, Ethernet, cable, fiber optic, and digital subscriber line (DSL). As part of the network path to and through the cloud 210, providers of internet connectivity (e.g., ISPs, backbone, etc.) may employ wireless technologies from point to point as well.

The internet cloud 210 may preferably the communications channel for communicating with the acquirer 203, as is discussed above.

The server 300 may also comprise input/output circuits 305 that include, but are not limited to, data entry and display devices (e.g., keyboards, monitors, touchpads, etc.). The memory 306 may be coupled to a payment database 223 and to a loyalty database 224. In one embodiment, the subscriber transactions database 323 and an interchange codes, rates, and fees database 324 are disposed in the same location as the memory 306. In another embodiment, the subscriber transactions database 323 and an interchange codes, rates, and fees database 324 are not disposed in the same location as the memory 306 and are accessed via messages transmitted and received over the links 303 rather than by direct connection as shown in the diagram.

The memory 306 may include an operating system 307 such as, but not limited to, Microsoft Windows, Mac OS, Unix, and Linux, where the operating system 307 is configured to manage execution by the CPU 301 of program instructions that are components of one or more application programs. In one embodiment, a single application program comprises a plurality of modules (or "code segments") 308, 309.1-309.N, 310.1-310.N, 311 resident in the memory 306 and identified as a configuration process (CONFIG) 308, a plurality of order synchronization processes (ORDER SYNC 1-ORDER SYNC N) 309.1-309.N, a plurality of payment processors (PAYMENT PROCESSOR 1-PAYMENT PROCESSOR N) 310.1-310.N, and an interchange code prediction processor 311. The memory 306 may comprise any number of other modules (not shown) which may be required to perform specified functions, but which are not discussed herein in order to more clearly teach aspects of the present invention.

Operationally, the server 300 may execute one or more of the code segments 308, 309.1-309.N, 310.1-310.N, 311 as required to communicate via COMMS 302 with each of N merchant subscribers 220 that participate in a subscription service corresponding to the system 200 of FIG. 2. The server 300 may execute the configuration segment 308 to access configurations of each of a plurality of POS terminals within a given merchant 220 and the same for other merchants 220 that are part of the subscription service. The server 300 may execute one or more of the order synchronization segments 309.1-309, each associated with a unique subscriber 220, to synchronize orders placed by guests at the merchant 220 and to track status of the orders, including when payment instruments are presented.

The server 300 may execute one or more of the payment processor segments 310.1-310.N, each associated with a unique subscriber 220, to pre-authorize transactions transmitted by the merchant 220, to receive batch transactions captured by the merchant 220, to transmit payment instructions including transaction amounts and holdback amounts to the payment processor 203 on behalf of the merchant, to receive holdback amounts (i.e., messages indicating deposits in the payment facilitator's back account) from the payment processor 203 associated with the merchant, to receive daily and monthly reports and statements from the payment processor related to the merchant 220, where the reports and statements details all transaction amounts and true fees (interchange fees, card network fees, and payment processor fees) associated with the merchant 220, to generate and transmit monthly statements to the merchant 220 detailing true fees charged for each transaction versus predicted fees charged, and to periodically receive updated interchange code lookup table data from an interchange code prediction processor 311 via bus IC PRED. In addition, the payment processors 310.1-310.N may execute to update the subscriber transaction database 323 with detailed transaction records for newly completed transactions, where each of the detailed transaction records includes, but is not limited to, the features described above that are employed for training and executing the interchange code prediction classification model.

The interchange codes, rates, and fees database 324 includes current and historical interchange codes provided by the issuers 230 along with their corresponding fees (i.e., percentage of total fees and per-transaction fees).

The interchange code prediction processor 311 may execute when changes are made to the interchange codes, rates, and fees database 324 to train an interchange code predication model according to the present invention as described above, to execute the model using all combinations of features to generate predicted interchange codes responsive to those features, and to generate and distribute a resulting interchange code lookup table that is indexed by the features to each of the payment processors 310.1-310.N for lookup of predicted interchange fees on a transaction-by-transaction basis. As discussed above, interchange codes are updated by the issuers 230 generally every six months, and so the present invention contemplates retraining of the model, execution of the model, and generation of an updated interchange code lookup table with the same frequency where enough transactions have been completed according to the updated interchange codes to provide for accurate training. In one embodiment, the interchange code prediction processor 311 may utilize one prior months of historical completed transactions for all subscribers 220 to train and execute the model. Another embodiment contemplates utilization of two prior months of historical completed transactions for all subscribers 220 to train and execute the model.

The payment facilitation server 300 according to the present invention is configured to perform the functions and operations as discussed above. The payment facilitation server 300 comprises logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the payment facilitation server 300 may be shared with other circuits, microcode, etc., that are employed to perform other functions and/or operations within the payment facilitation server 300. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

Figure 4:
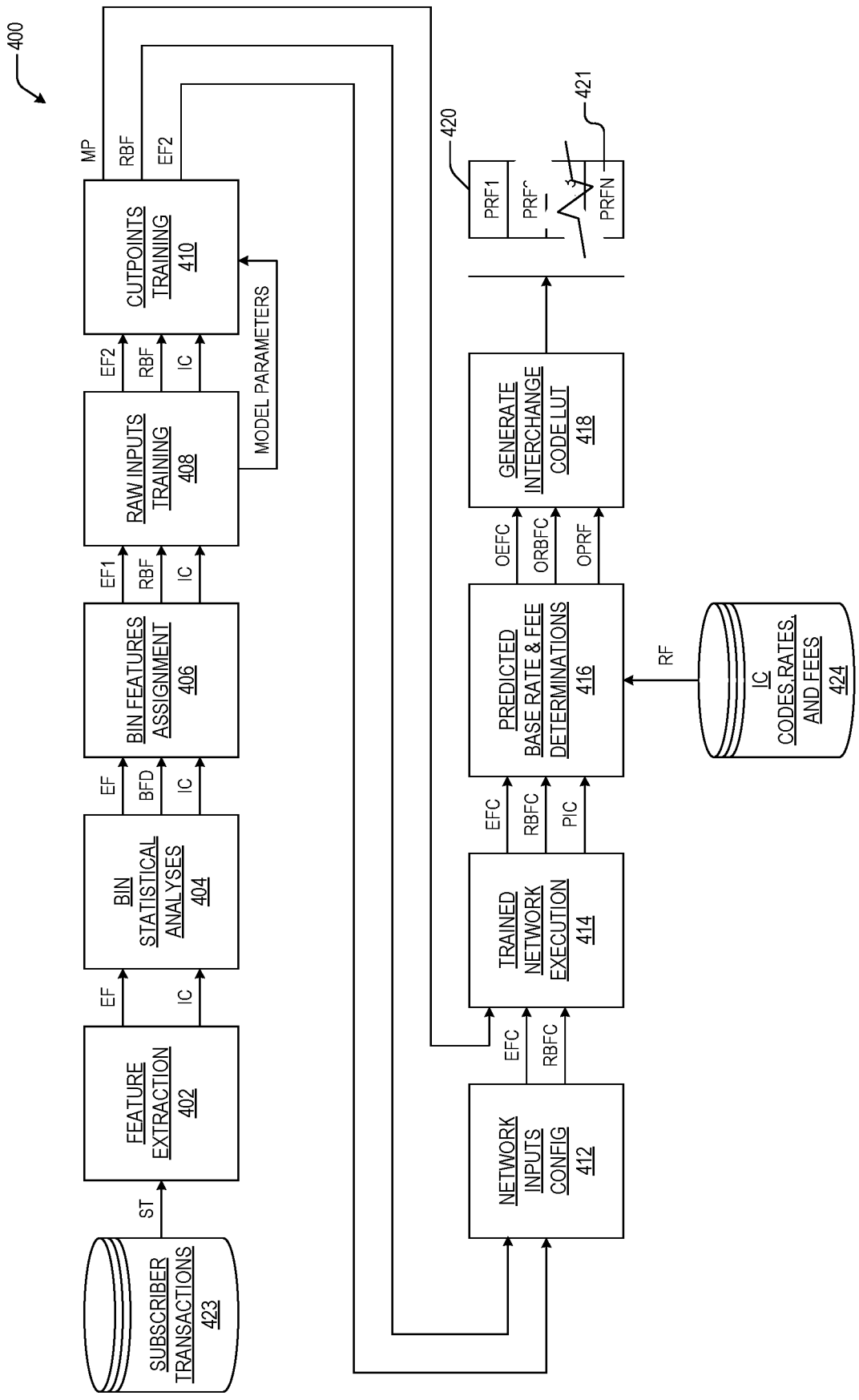
FIG. 4 is a flow diagram showing an exemplary method for predicting transaction-based interchange codes according to the present invention, such as may be employed by the payment facilitation server of FIG. 3.

Now turning to FIG. 4, flow diagram 400 is presented showing an exemplary method for predicting transaction-based interchange codes according to the present invention, such as may be employed by the payment facilitation server of FIG. 3. Flow begins at block 423 where a subscriber transactions database 423, such as the transactions database 323 discussed above with reference to FIG. 3 is accessed to obtain historical completed transactions (one month prior or two months prior) for purposes of training a interchange code prediction random forest model according to the present invention. Flow then proceeds to bock 402.

At block 402, features as discussed above (e.g., BIN, transaction amount, tip percentage, AVS results, authorization and capture times, card type, etc.) are extracted from the transaction records and are provided to a BIN statistical analyses block 404 via bus EF along with corresponding true interchange codes for each of the historical transactions via bus IC.

At block 404, a series of statistical analyses are performed on the BINS to determine map each of the BIN to each of four BIN categories: regulated debit, debit, rewards, and high rewards along with a probability for, as one skilled in the art will appreciate, the same credit card having the same BIN may be used, say, for debit or credit. If the statistical analyses on the historical transactions show that a given BIN has been used 20 percent the time as a debit card and 80 percent the time as a high rewards card, the mapping would show the given BIN maps to regulated debit with 0 probability, debit with 0.2 probability, rewards with 0 probability, and high rewards with 0.8 probability. These BIN feature categories distributions are provided to a BIN features assignment block 406 via bus BFD along with the transaction data (via bus EF) and true interchange codes (via bus IC). Flow then proceeds to block 406.

At block 406, each of the probabilities for each of the BIN features categories is rounded to one of four values. Through cut point results exhibited when designing the interchange code prediction random forest model, the present inventors have noted that all probabilities can be rounded without loss of accuracy to 0, 0.33, 0.67, and 1. Thus the BIN statistical analyses block 404 determines probabilistic distributions for each BINs analyzed, and the BIN features assignment block rounds those probabilities to one of the values above, sum of probabilities across all BIN feature categories equals 1 for each BIN. The rounded BIN feature distributions are provided to a raw inputs training block 408 via bus RBF along with the true interchange codes via bus IC. The actual BINS for each of the transactions are eliminated from the data on bus EF and the remaining transaction data is provided to block 408 via bus EF1.

At block 408, the features provided via buses EF1 and RBF are employed to train the interchange code prediction random forest model according to the present invention using the true interchange codes provided via IC as target outputs. As part of the training, all other non-discrete inputs (i.e., transaction amount, tip percentage, and hours between authorization and capture) are cut point analyzed to determine rounding thresholds that do not sacrifice interchange code prediction accuracy, and the non-discrete inputs in a corresponding range are rounded to one of the two range threshold boundaries. For example, all tip percentages may be rounded to a less than or equal to 20 percent category or two a greater than 20 percent category. The non-discrete inputs of EF1 are replaced with the rounded inputs and the inputs are provided to a cut points training block 410 on bus EF2 (which now contains only discrete inputs). Rounded BIN feature distributions are provided via bus RBF and the interchange codes are provided via bus IC. In addition, parameters (layers, weights, etc.) from the interchange code prediction random forest model trained on non-discrete values in are provided to block 410 via bus MODEL PARAMETERS.

At block 410, the model trained in block 408 is trained again, but this time using the rounded inputs (in addition to all other discrete inputs) determine at block 408 against the target interchange code outputs provided via bus IC. Updated model parameters generated and are output on bus MP to block 414 and all rounded discrete inputs are provided to block 412 via bus EF2 along with rounded BIN feature distributions via bus RBF.

At block 412, the inputs for a trained interchange code prediction random forest model that was trained and updated at blocks 408 and 410 and that were provided via buses EF2 and RBF are configured in a matrix that shows all combinations for those inputs, including combinations that may not have been exhibited in any of the transactions in the subscriber transactions database 423. Accordingly, the portion of the matrix corresponding to a complete set of rounded BIN feature distributions is provided via bus RBFC and the remaining portion of the matrix corresponding to a complete set of all other rounded features is provided via bus EFC. Flow then proceeds to block 414.

At block 414, the trained and updated interchange code prediction random forest model is executed against the complete set of rounded features and rounded BIN feature distributions to generate a corresponding set of predicted interchange code distributions. In one embodiment, the number of interchange codes in each interchange code distribution comprises the top 250 interchange codes predicted by the trained and updated model along with corresponding probabilities that that combination of inputs will fall into each of the top 250 interchange codes (ICs), which are output via bus PIC. For example, for a given combination of inputs (including rounded BIN features), the trained network may generate a distribution of the form:

$$0.9(IC1)+0.1(IC2)+0.2(IC3)+0.0(IC4)+ \ldots +0.7(IC234)+ \ldots +0.0(IC250),$$

Where all the individual probability values add up to 1. Flow then proceeds to block 416.

At block 416, for each combination of inputs in the complete set, the corresponding 250 interchange codes in their corresponding predicted interchange code distribution are employed as indices into the interchange codes, rates, and fees database 424 to obtain associated rates and fees and the probabilities for each of the interchange codes in the distribution, in vector form, are employed to calculate a predicted interchange fee corresponding to that interchange code distribution. Thus, a dot product of the probabilities in vector form is calculated against the associated rates and fees in vector form. For instance, assume that a predicted interchange code distribution is as follows for a given combination of inputs:

$$0.5(IC1)+0.3(IC2)+0.0(IC3)+ \ldots +0.0(IC249)+0.2(IC250).$$

There are only 3 non-zero probabilities in the distribution corresponding to IC1, IC2 and IC250. Accordingly, the rate and fee for each of the three interchange codes are retrieved from the database 424. Assume that the rates (percentage of transaction) and fees (per transaction cost) are as follows:

IC1: 2.4% of total plus $0.10 per transaction;

IC2: 3.5% of total plus $0.15 per transaction; and

IC250: 2.0% of total plus $0.05 per transaction.

Calculation of a predicted interchange rate and fee for that combination of inputs is as follows:

$$\text{Predicted Rate}=0.5*2.4+0.3*3.5+0.2*2.0=2.65\% \text{ of total; and}$$

$$\text{Predicted Fee}=0.5*\$0.10+0.3*\$0.15+ 0.2*\$0.05=\$0.105 \text{ per transaction.}$$

Thus, the predicted rate and predicted fee for the combination of inputs will be applied to any transaction that having inputs matching the given combination when it is submitted to the payment facilitator 202 for completion and that amount of funds will be transmitted to the payment processor 203 as a holdback amount. For a $100.00 transaction amount having inputs that match the combination, the holdback amount based upon the above predicted interchange rate and fee is $2.76 (rounded up). All of the complete set of inputs, rounded BIN feature distributions and corresponding predicted rates and fees are orders for indexing and are provided to block 418 on respective buses OEFC, ORBFC, and OPRF. Flow then proceeds to block 418.

At block 418, the interchange code predication processor 311 generates a current predicted interchange rates and fees lookup table 420 that is indexed by a combination of inputs derived from transaction data, and the lookup table is provided to each of the payment processors 310.1-310.N for use in real time when processing transactions submitted for completion by a corresponding merchant 220. The table 420 may comprise N table entries 421 that each correspond to a unique combination of inputs derived from the transaction data and which are accessed for retrieval by the unique combination of inputs. In one embodiment, the table 420 may comprise approximately one million entries 421 that each contain a predicted interchange rate (i.e., percentage of a transaction total amount) and a predicted interchange per-transaction fee (i.e., a one-time fee for processing a transaction) that are determined as described above with reference to blocks 402, 404, 406, 408, 410, 410, 414, 416, and 418. In one embodiment, the current predicted interchange rates and fees lookup table 420 is distributed to each of the payment processors 310.1-310.N by the interchange code prediction processor 311 for use in processing transactions for their corresponding merchant 220. In another embodiment, the current predicted interchange rates and fees lookup table 420 resides within the interchange code prediction processor 311 and may be accessed by to each of the payment processors 310.1-310.N by for use in processing transactions for their corresponding merchant 220. The interchange code prediction processor 311 may detect changes in entries in the interchange codes, rates, and fees database 324, and may execute the steps described above to generate an updated predicted interchange rates and fees lookup table 420 upon detection of the changes, or may be directed to perform updates according to a schedule such as every six months.

Figure 5:
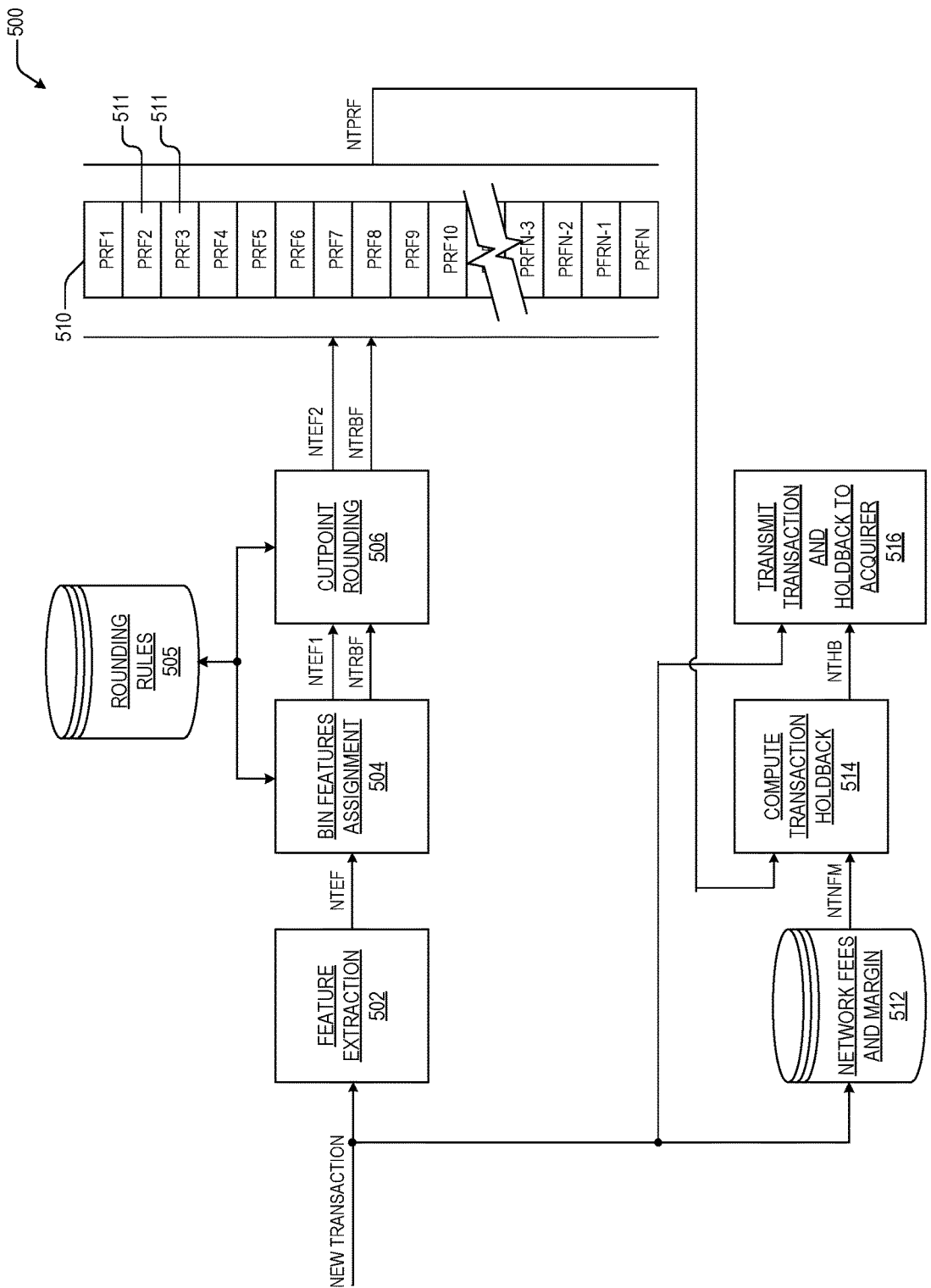
FIG. 5 is a flow diagram illustrating an exemplary low-latency, transaction-based, interchange prediction method according to the present invention, such as may be employed by the payment facilitation server of FIG. 3.

Finally referring to FIG. 5, a flow diagram 500 is presented illustrating an exemplary low-latency, transaction-based, interchange prediction method according to the present invention, such as may be employed by the payment facilitation server of FIG. 3. The diagram 500 depicts the flow of steps that may be performed by one of the payment processors 310.1-310.N upon receipt of credit card transactions submitted for completion by a corresponding merchant 220.

At block 502, a new transaction is accessed for feature extraction in substantially the same manner as is described above with reference to block 402 of FIG. 4, where the extracted features include both discrete and non-discrete feature, and which are presented on bus NTEF.

At block 504, non-discrete BIN features are assigned for the BIN presented over NTEF, and the non-discrete BIN features are rounded according to rounding rules provided in a rounding rules database 505. Rules for rounding BIN features are derived as described above with reference to block 406 and are stored in the rounding rules database. In one embodiment, each presented BIN is used to index into a rounded BIN features table having records that each comprise rounded BIN feature values for each of N BIN features. In the examples described above, each record in the table having 100,000 entries (for a 6-digit BIN) would have four fields: rounded probability of regulated debit feature, rounded probability of debit feature, rounded probability of rewards feature, rounded probability of high rewards feature. Extracted features minus the BIN are presented on bus NTEF1 and the rounded bin features for the transaction are presented on bus NTRBF.

At block 506, the payment processor 310.1-310.N executes cut point rounding for all remaining non-discrete extracted features (e.g., transaction total amount, tip percentage, hours between authorization and capture according to rounding rules provided in the rounding rules database 505, and which were generated during raw inputs training of the interchange code prediction random forest model according to the present invention, which is described above with reference to block 408 of FIG. 4. Accordingly, all non-discrete extracted features presented via NTEF1 are replaced with corresponding rounded extracted features, and are presented on bus NTEF2. The rounded BIN features are presented on bus NTRBF. The unique combination of discrete and rounded transaction features presented on NTEF2 and rounded BIN features presented on NTRBF are employed to index a predicted interchange rate and fee table 510 having entries 511 that each comprise a predicted interchange rate and predicted interchange fee that have been pre-calculated as described above with reference to blocks 416 and 418 of FIG. 4. The indexed entry 511 corresponding to the unique combination is provided via bus NTPRF.

AT block 512, the payment processor 310.1-310.N extracts data (e.g., card network) from NEW TRANSACTION that is required to compute both network fees for the transaction and also margin (i.e., percentage of transaction total plus a per-transaction fee) charged by the payment facilitator 202. An amount comprising the cumulative network fees and payment facilitator margin are presented on bus NTNFM along with the transaction total amount.

At block 515, a predicted interchange charge for the transaction is calculated using the predicted interchange rate and predicted interchange fee provided via NTPRF for the total amount of the transaction provided via NTNFM. The predicted interchange charge is then added to the amount comprising the cumulative network fees and payment facilitator margin determined at block 512 to yield a holdback amount for the transaction. The holdback amount is presented on bus NTHB.

Finally at block 516, the transaction amount for the merchant 220, along with other required transaction data obtained from NEW TRANSACTION are transmitted by the payment facilitation server 300 to the payment processor 203 along with the corresponding holdback amount. Upon settlement of the transaction, the payment processor 203 may transfer funds for the holdback amount to the payment facilitator 202 and may transfer funds for the transaction amount minus the holdback amount to the merchant's bank account.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer program product, a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices. The devices may comprise one or more CPUs that are coupled to a computer-readable storage medium. Computer program instructions for these devices may be embodied in the computer-readable storage medium. When the instructions are executed by the one or more CPUs, they cause the devices to perform the above-noted functions, in addition to other functions.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims. For example, components/elements of the systems and/or apparatuses may be integrated or separated. In addition, the operation of the systems and apparatuses disclosed herein may be performed by more, fewer, or other components and the methods described may include more, fewer, or other steps. Additionally, unless otherwise specified steps may be performed in any suitable order.

Although specific advantages have been enumerated above, various embodiments may include some, none, or all of the enumerated advantages.

What is claimed is:

1. A computer-implemented method for predicting interchange codes corresponding to credit card transactions, the method comprising:
    retrieving a historical completed transactions set from a database that corresponds to a plurality of merchants, where each completed transaction in the set comprises transaction features, a bank identification number (BIN), and a corresponding true interchange code;
    extracting the transaction features from the completed transactions set;
    transforming all BINs in the set into corresponding BIN features that comprise probabilities of a given BIN falling into each of the corresponding BIN features, where each of the probabilities are determined by analyzing the historical completed transactions set;
    creating a first training set comprising all transaction features, all BIN features, and all true interchange codes associated with the historical completed transactions set;
    training a random forest model using the first training set, wherein said training comprises rounding of all of the BIN features and non-discrete ones of the transaction features, and generating a second training set comprising rounded BIN features, rounded transaction features, discrete ones of the transaction features, and the true interchange codes;
    training the random forest model using the second training set to generate a trained random forest model for prediction of the interchange codes;
    generating a lookup table that maps each combination of a set of all rounded transaction features to a corresponding predicted interchange charge, wherein:
        the corresponding predicted interchange charge comprises a weighted sum of interchange charges for a subset of all of the interchange codes;
        a weight for each term of the weighted sum indicates a probability that an associated one of the set of all rounded transaction features will result in a corresponding interchange code with the subset;
        probabilities for weights in the weighted sum are previously determined by executing the trained random forest model; and
        outputs of the table responsive to specific rounded transaction features comprises a predicted interchange charge for a corresponding transaction; and
    for new transactions, extracting and rounding corresponding transation-specific features and indexing the lookup table to obtain corresponding interchange charges.

2. The computer-implemented method as recited in claim 1, wherein the transaction features further comprise a total transaction amount.

3. The computer-implemented method as recited in claim 2, wherein the transaction features further comprise a tip percentage.

4. The computer-implemented method as recited in claim 3, wherein the transaction features further comprise a type of transaction and an address verification system response.

5. The computer-implemented method as recited in claim 4, wherein the transaction features further comprise a card network, a card type, and a merchant category code.

6. The computer-implemented method as recited in claim 1, wherein the BIN features comprise regulated debit and debit.

7. The computer-implemented method as recited in claim 6, wherein the BIN features further comprise rewards and high rewards.

8. A computer-readable storage medium storing instructions that, when executed by a computer, cause the computer to perform a method for using a computer system to predict interchange codes corresponding to credit card transactions, the method comprising:
    retrieving a historical completed transactions set from a database that corresponds to a plurality of merchants, where each completed transaction in the set comprises transaction features, a bank identification number (BIN), and a corresponding true interchange code;
    extracting the transaction features from the completed transactions;
    transforming all BINs in the set into corresponding BIN features that comprise probabilities of a given BIN falling into each of the corresponding BIN features, where each of the probabilities are determined by analyzing the historical completed transactions set;
    creating a first training set comprising all transaction features, all BIN features, and all true interchange codes associated with the historical completed transactions set;
    training a random forest model using the first training set, wherein said training comprises rounding of all of the BIN features and non-discrete ones of the transaction features, and generating a second training set comprising rounded BIN features, rounded transaction features, discrete ones of the transaction features, and the true interchange codes;
    training the random forest model using the second training set to generate a trained random forest model for prediction of the interchange codes;
    generating a lookup table that maps each combination of a set of all rounded transaction features to a corresponding predicted interchange charge, wherein:
        the corresponding predicted interchange charge comprises a weighted sum of interchange charges for a subset of all of the interchange codes;
        a weight for each term of the weighted sum indicates a probability that an associated one of the set of all rounded transaction features will result in a corresponding interchange code within the subset;
        probabilities for weights in the weighted sum are previously determined by executing the trained random forest model; and
        outputs of the table responsive to specific rounded transaction features comprises a predicted interchange charge for a corresponding transaction; and
    for new transactions, extracting and rounding corresponding transaction-specific features and indexing the lookup table to obtain corresponding interchange charges.

9. The computer-readable storage medium as recited in claim 8, wherein the transaction features comprise a total transaction amount.

10. The computer-readable storage medium as recited in claim 9, wherein the transaction features further comprise a tip percentage.

11. The computer-readable storage medium as recited in claim 10, wherein the transaction features further comprise a type of transaction and an address verification system response.

12. The computer-readable storage medium as recited in claim 11, wherein the transaction features further comprise a card network, a card type, and a merchant category code.

13. The computer-readable storage medium as recited in claim 8, wherein the BIN features comprise regulated debit and debit.

14. The computer-readable storage medium as recited in claim 13, wherein the BIN features further comprise rewards and high rewards.

15. A computer program product for predicting interchange codes corresponding to credit card transactions, the computer program product comprising:
   a computer readable non-transitory medium having computer readable program code stored thereon, the computer readable program code comprising:
      program instructions to retrieve a historical completed transactions set from a database that corresponds to a plurality of merchants, where each completed transaction in the set comprises transaction features, a bank identification number (BIN), and a corresponding true interchange code;
      program instructions to extract the transaction features from the completed transactions;
      program instructions to transform all BINs in the set into corresponding BIN features that comprise probabilities of a given BIN falling into each of the corresponding BIN features, where each of the probabilities are determined by analyzing the historical completed transactions set;
      program instructions to create a first training set comprising all transaction features, all BIN features, and all true interchange codes associated with the historical completed transactions set;
      program instructions to train a random forest model using the first training set, wherein said training comprises rounding of all of the BIN features and non-discrete ones of the transaction features, and generating a second training set comprising rounded BIN features, rounded transaction features, discrete ones of the transaction features, and the true interchange codes;
      program instructions to train the random forest model using the second training set to generate a trained random forest model for prediction of the interchange codes;
      program instructions to generate a lookup table that maps each combination of a set of all rounded transaction features to a corresponding predicted interchange charge, wherein:
         the corresponding predicted interchange charge comprises a weighted sum of interchange charges for a subset of all of the interchange codes;
         a weight for each term of the weighted sum indicates a probability that an associated one of the set of all rounded transaction features will result in a corresponding interchange code with the subset;
         probabilities for weights in the weighted sum are previously determined by executing the trained random forest model; and
         outputs of the table responsive to specific rounded transation features comprises a predicted interchange charge for a corresponding transaction; and
      program instructions to, for new transactions, extract and round corresponding transaction-specific features and index the lookup table to obtain corresponding interchange charges.

16. The computer program product as recited in claim 15, wherein the transaction features comprise a total transaction amount.

17. The computer program product as recited in claim 16, wherein the transaction features further comprise a tip percentage.

18. The computer program product as recited in claim 17, wherein the transaction features further comprise a type of transaction and an address verification system response.

19. The computer program product as recited in claim 15, wherein the BIN features comprise regulated debit and debit.

20. The computer program product as recited in claim 19, wherein the BIN features further comprise rewards and high rewards.

* * * * *